US010378457B2

(12) United States Patent
Jayasankaran et al.

(10) Patent No.: US 10,378,457 B2
(45) Date of Patent: Aug. 13, 2019

(54) ENGINE SPEED CONTROL STRATEGY WITH FEEDBACK AND FEEDFORWARD THROTTLE CONTROL

(71) Applicant: Caterpillar Inc., Peoria, IL (US)

(72) Inventors: Karthik Jayasankaran, Dunlap, IL (US); Arvind Sivasubramanian, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 91 days.

(21) Appl. No.: 15/805,297

(22) Filed: Nov. 7, 2017

(65) Prior Publication Data

US 2019/0136769 A1 May 9, 2019

(51) Int. Cl.
*F02D 41/18* (2006.01)
*F02D 9/02* (2006.01)

(52) U.S. Cl.
CPC ............... *F02D 9/02* (2013.01); *F02D 41/18* (2013.01); *F02D 2009/0228* (2013.01); *F02D 2200/0406* (2013.01); *F02D 2200/0611* (2013.01)

(58) Field of Classification Search
CPC ...... F02D 9/02; F02D 41/18; F02D 2009/028; F02D 2200/0406; F02D 2200/0611
See application file for complete search history.

(56) References Cited

U.S. PATENT DOCUMENTS 6,021,755 A 2/2000 Maddock et al.
6,701,890 B1 3/2004 Suhre et al.
7,082,924 B1 8/2006 Ruedin
8,489,307 B2 7/2013 Burkhardt et al.
9,273,620 B2 * 3/2016 Klaser-Jenewein .... F02D 29/06
9,587,571 B2 * 3/2017 Hagari ................ F02D 41/0007
2004/0024518 A1 * 2/2004 Boley ..................... F02D 41/18 701/104
2004/0187846 A1 * 9/2004 Hoshino ............... F02D 11/105 123/399
2016/0040611 A1 * 2/2016 Flohr ................. F02D 19/0642 123/528
2016/0160771 A1 * 6/2016 Wang ...................... F02B 33/40 123/564
2017/0037797 A1 * 2/2017 Liu ..................... F02D 41/0052

FOREIGN PATENT DOCUMENTS

DE 102016200723 A1 7/2017
WO 2015107753 A1 7/2015

* cited by examiner

*Primary Examiner* — Thomas N Moulis
(74) *Attorney, Agent, or Firm* — Jonathan F. Yates

(57) ABSTRACT

An engine speed control system for an internal combustion engine includes a throttle, and a sensor that monitors a parameter indicative of pressure or density of fuel and air in an inlet manifold of the engine. The electronic control unit is coupled with the throttle and the sensor and structured to calculate a target mass flow through the throttle, a feedforward control term based on the target mass flow, and a feedforward control term based on data produced by the sensor. The electronic control unit is further structured to vary a position of the throttle based on the feedforward and feedback control terms to adjust a mass flow through the throttle toward the target mass flow. The control system is applicable in throttle governed as well as fuel governed systems.

20 Claims, 2 Drawing Sheets

ENGINE SPEED CONTROL STRATEGY WITH FEEDBACK AND FEEDFORWARD THROTTLE CONTROL

TECHNICAL FIELD

The present disclosure relates generally to an engine speed control strategy, and more particularly to varying throttle position to adjust a mass flow through the throttle utilizing both feedforward and feedback control.

BACKGROUND

Internal combustion engines are well known and widely used, for applications ranging from vehicle propulsion to electrical power generation, and many in many others. All internal combustion engines operate based upon the same fundamental principle of igniting a charge of a combustible fuel with oxidant in a cylinder to produce a rapid pressure and temperature rise that drives a piston coupled with a rotatable crankshaft. Spark-ignited engines such as gasoline engines to power passenger cars and small power equipment, and diesel engines in both light duty and heavy duty vehicle, machinery and electric power generation applications will be familiar to most. In recent years, there has been increasing interest in the development of internal combustion engines that operate on alternative fuels, including gaseous fuels such as natural gas, biogas, landfill gas, and still others.

Modern engines tend to be highly sophisticated pieces of equipment, with numerous different systems and subsystems the operation of which must be monitored and frequently or continually adjusted to conform with various specifications as well as changing operational demands. An intake system conveys air and sometimes also fuel, and potentially recirculated exhaust gas, to a cylinder in the engine for combustion. The intake system can include filters, one or more compressors, coolers, and various items of monitoring equipment for enabling pressure and temperature at various locations in the intake system to be monitored and controlled. An exhaust system can include one or more turbines, particulate filters, catalysts, and other mechanisms for treating exhaust, and still other equipment. The fuel system stores fuel, typically pressurizes the fuel, and delivers the fuel by way of the intake system or, for example, by direct fuel injection, to the cylinders for combustion.

Regardless of engine type and associated engine equipment, it is typically desirable to control a rotational speed (RPM) of the engine to enable the engine to operate at a power output, an exhaust/emissions output, an efficiency or otherwise in a desired or specified manner. All of the above systems/subsystems, and others not mentioned, can be impacted by and/or affect engine speed control. While various engine speed control strategies have been proposed over the years, many engines can be classified generally as either "throttle governed" or "fuel governed." In a fuel governed engine, an engine speed error, the difference between a desired engine speed and an actual or observed engine speed, is typically used to set a fuel flow command, and a throttle position is varied to provide a desired air-to-fuel ratio (AFR) based on the amount of fuel that is being requested. Liquid fueled engines, including diesel engines, some gaseous fuel engines, and some dual fuel engines can be fuel governed. In throttle governing strategies, engine speed error is used to set a desired intake or inlet manifold pressure (IMAP), and the throttle is adjusted in an attempt to attain the desired IMAP. Throttle governing is commonly applied to gaseous fuel engines. These and other strategies have their advantages and disadvantages, and there is always room for improvement and/or alternatives. An example engine speed control strategy is known from U.S. Pat. No. 6,021,755 to Maddock et al., in which a fuel command is apparently generated based on manifold air pressure and temperature, and the fuel command then modified on the basis of a comparison of desired and actual engine speeds.

SUMMARY OF THE INVENTION

In one aspect, an engine speed control system for an internal combustion engine includes a throttle, and a sensor structured to monitor a parameter indicative of at least one of a pressure or a density of gaseous fuel and air in an inlet manifold of the internal combustion engine. The control system further includes an electronic control unit coupled with the throttle and coupled with the sensor. The electronic control unit is structured to calculate a target mass flow through the throttle to produce at least one of a desired pressure or a desired density of gaseous fuel and air in the inlet manifold of the internal combustion engine, and to calculate a feedforward control term based on the target mass flow through the throttle. The electronic control unit is further structured to calculate a feedback control term based on data produced by the sensor, and to command varying a position of the throttle based on the feedforward control term and the feedback control term to adjust a mass flow through the throttle toward the target mass flow.

In another aspect, a method of controlling engine speed in an internal combustion engine includes calculating a target mass flow through a throttle to produce at least one of a desired pressure or a desired density of gaseous fuel and air in an inlet manifold of the internal combustion engine, and calculating a feedforward control term based on the target mass flow through the throttle. The method further includes receiving data indicative of at least one of a pressure or a density of gaseous fuel and air in an inlet manifold of the internal combustion engine. The method still further includes calculating a feedback control term based on the data indicative of at least one of a pressure or a density of gaseous fuel and air in an inlet manifold of the internal combustion engine, and varying a position of the throttle based on the feedforward control term and the feedback control term such that a mass flow through the throttle is adjusted toward the target mass flow.

In still another aspect, an internal combustion engine system includes an internal combustion engine, and an intake system structured to convey a gaseous fuel and air to the internal combustion engine. The internal combustion engine system further includes a throttle, and an engine speed control system having a sensor structured to monitor a parameter indicative of at least one of a pressure or a density of gaseous fuel and air in an inlet manifold of the internal combustion engine. The engine speed control system further includes an electronic control unit coupled with the throttle and coupled with the sensor. The electronic control unit is structured to calculate a target mass flow through the throttle to produce at least one of a desired pressure or a desired density of gaseous fuel and air in the inlet manifold of the internal combustion engine, and calculate a feedforward control term based on the target mass flow through the throttle. The electronic control unit is further structured to calculate a feedback control term based on data produced by the sensor, and command varying a position of the throttle based on the feedforward control term and the feedback control term to adjust a mass flow through the throttle toward the target mass flow.

DETAILED DESCRIPTION

Figure 1:
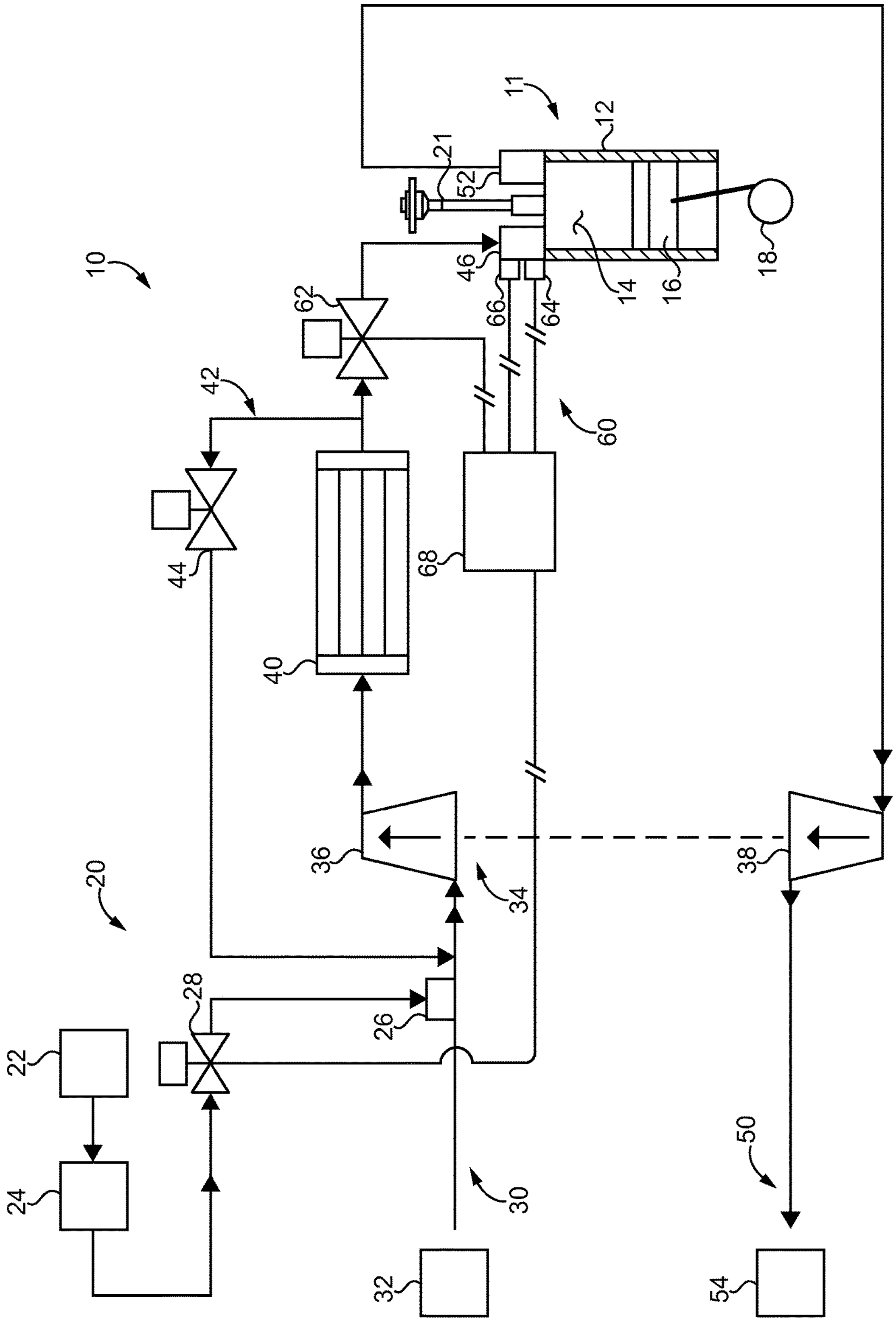
FIG. 1 is a diagrammatic view of an internal combustion engine system, according to one embodiment.

Referring to FIG. 1, there is shown an internal combustion engine system 10, according to one embodiment, and including an internal combustion engine 11 (hereinafter "engine 11") having an engine housing 12 with a plurality of cylinders 14 formed therein. Although only a single cylinder 14 is shown, it will be appreciated that engine 11 could include any number of cylinders 14 in a V-configuration, an in-line configuration, or in another arrangement. Descriptions herein of any element or feature in the singular will be analogously understood to refer to any of the other ones of multiple similar or identical elements or features, unless otherwise indicated. A piston 16 is positioned within cylinder 14 and movable between a top dead center position and a bottom dead center position to rotate a crankshaft 18 in a generally conventional manner, typically in a four-stroke engine cycle. Internal combustion engine system 10 further includes a fuel system 20 having a fuel supply 22, pressurization and supply equipment 24, and a fuel metering valve 28 that controls supplying the fuel to a fuel inlet 26 to an intake system 30 of internal combustion engine system 10. In an implementation, engine 11 includes a gaseous fuel engine operated on a gaseous fuel such as natural gas, methane, propane, landfill gas, biogas, or still another gaseous fuel or gaseous fuel mixture. Engine 11 could also be a dual fuel engine, such as a diesel and gaseous fuel engine. In a gaseous fuel application, fuel system 20 is configured to store the gaseous fuel in a cryogenic liquid state. Accordingly, fuel supply 22 can be equipped with suitable apparatus for cryogenically storing liquified gaseous fuel. Equipment 24 could include equipment of generally known design that pumps the gaseous fuel in a liquified state to a vaporizer (not shown) to transition the liquified gaseous fuel to a gaseous state, and furthermore pressurization equipment such that the gaseous fuel is delivered into intake system 30 at a pressure higher than atmospheric pressure, and potentially higher than a compressor outlet pressure depending upon the design of intake system 30.

Intake system 30 includes a fresh-air inlet 32, a compressor 36 which may be part of a turbocharger 34, an aftercooler 40, a recirculation loop 42 including a recirculation valve 44, and an inlet manifold 46. In the illustrated embodiment, fuel inlet 26 is positioned upstream of compressor 36, such that compressor 36 outputs a compressed mixture of fuel and air. In other versions, fuel inlet 26 could be positioned downstream compressor 36, closer to cylinder 14, with gaseous fuel being injected into an intake runner or the like, or potentially directly into cylinder 14. In an implementation, inlet manifold 46 may supply pressurized gaseous fuel and air into each of a plurality of cylinders 14 for combustion therein. An ignition mechanism 21 is coupled with cylinder 14 and structured to ignite the charge of fuel and air within cylinder 14, for instance, utilizing spark ignition within a combustion prechamber. Ignition mechanism 21 could be supplied with combustible fuel and/or air from a dedicated supply that is part of fuel system 20, or could receive fuel and air from cylinder 14 directly. Internal combustion engine system 10 further includes an exhaust system 50 including an exhaust manifold 52, an exhaust outlet 54, and a turbine 38 of turbocharger 34. As will be further apparent from the following description, internal combustion engine system 10 is adapted for engine speed control employing both feedback and feedforward control techniques for throttle positioning, applicable regardless of whether fuel governing or throttle governing is employed.

To this end, internal combustion engine system 10 includes an engine speed control system 60 for engine 11 having an electrically actuated throttle 62 positioned within intake system 30, and a sensor 64 structured to monitor a parameter indicative of at least one of a pressure or a density of gaseous fuel and air in inlet manifold 46. In an implementation, sensor 64 includes a pressure sensor, hereinafter referred to as an inlet manifold pressure sensor or IMAP sensor, but not limited as such. Those skilled in the art will appreciate that density of a gaseous mixture could be used in certain instances instead of or in addition to pressure, according to known techniques. Engine speed control system 60 (hereinafter "control system 60") may also include a temperature sensor 66 structured to monitor temperature of a mixture of gaseous fuel in inlet manifold 46. An engine speed sensor coupled with crankshaft 18 or an engine flywheel, for instance, a NOx sensor, and still other sensing mechanisms (not shown) could be part of or coupled with engine speed control system 60. It should also be appreciated that monitoring pressure and/or temperature of a mixture of gaseous fuel and air in inlet manifold 46 could be achieved by way of direct measurement of the parameter of interest at the location of interest, within inlet manifold 46. In other instances, the parameters could be measured at a different location, determined by indirect measurements or observations, inferred, or determined by any suitable other means or mechanism.

During operating engine 11 it can be desirable to vary engine speed and/or respond to engine speed changes induced by external factors. It may be desirable to adjust engine speed when engine 11 experiences an engine load change, to place engine 11 in a speed range that is optimally efficient for changed conditions, to produce a desired emissions output of engine 11, or for still other reasons. Engine speed changes are commonly relatively short term and temporary, meaning that engine 11 may need to increase its engine speed from an engine speed setpoint but then return to the engine speed setpoint relatively rapidly, or alternatively reduce engine speed from the engine speed setpoint but soon after increase engine speed to return to the engine speed setpoint. In either case, it is typically desirable to structure engine speed control system 60 such that engine speed can be adjusted as quickly as practicable without overshooting, undershooting, or introducing instability into the system.

Certain known strategies for engine speed control calculate an engine speed error, which is a difference between a desired engine speed and an actual or observed engine speed, and vary inlet manifold pressure responsive to the engine speed error. Increasing inlet manifold pressure can, for instance, increase an amount of gaseous fuel and air that is combusted in an engine cycle, releasing more energy within the cylinder and increasing engine speed. Decreasing inlet manifold pressure can decrease the amount of fuel and air, thus decreasing the quantity of energy released and reducing engine speed. A separate control can vary an amount of fuel that is admitted to the intake system. Control over throttle position and thus throttle area can be used to vary the inlet manifold pressure in this general manner. Such strategies are referred to generally as throttle governed engine speed control as noted above. In other strategies, an engine speed error is used to set a fuel flow command, and air fuel ratio (AFR) control is used to position the throttle and obtained a desired manifold pressure to provide an appropriate amount of air for the fuel that is delivered. Such strategies are generally referred to as fuel governed engine speed control as noted above.

Both fuel governed and throttle governed strategies exploit the relationship between throttle position and inlet manifold pressure. Throttle-to-manifold pressure response, however, can vary based upon operating conditions around the throttle, including pressure, temperature, humidity, throttle valve design, and variations even among seemingly identical or similar engines in the physical structure and operation of the throttle. Accordingly, in at least part of a position range of the throttle, the relationship between inlet manifold pressure and throttle position is non-linear and can be difficult to predict. During transients, a relatively large pressure ratio across the throttle can exist, or at least a relatively large pressure ratio between the throttle and the inlet manifold. For these reasons, during transients, the non-linearity and/or unpredictability of the throttle area to inlet manifold pressure relationship can be particularly acute and problematic from a controls standpoint. As further discussed herein, the present disclosure provides throttle positioning feedforward and feedback control concepts that account for this non-linear and difficult to predict relationship.

Engine speed control system 60 further includes an electronic control unit 68 coupled with throttle 62 and coupled with sensor 64, and also typically coupled with temperature sensor 66, and fuel metering valve 28. Electronic control unit 68 can include any suitable data processing device, such as a microprocessor, a microcontroller, a field programmable gate array or FPGA, or still other devices. Electronic control unit 68 may further include a machine readable memory such as RAM, ROM, EPROMM, DRAM, SDRAM, or still another suitable memory type, whereupon computer executable program instructions are stored that enable electronic control unit 68 to perform calculations for implementing throttle control and engine speed control according to the principles set forth herein.

By executing the computer executable program instructions, electronic control unit 68 is structured to calculate a target mass flow 100 through throttle 62 to produce at least one of a desired pressure or a desired density of gaseous fuel and air in inlet manifold 46. Electronic control unit 68 is further structured to calculate a feedforward control term 104 based on the target mass flow 100 through throttle 62, and to calculate a feedback control term 94 based on data produced by IMAP sensor 64. Electronic control unit 68 is further structured to command varying a position of throttle 62 based on the feedforward control term 104 and the feedback control term 94 to adjust a mass flow through throttle 62 toward the target mass flow 100. Further features and refinements of the operation of engine speed control system 60 will be apparent from the following description of calculations and example control logic flow.

Figure 2:
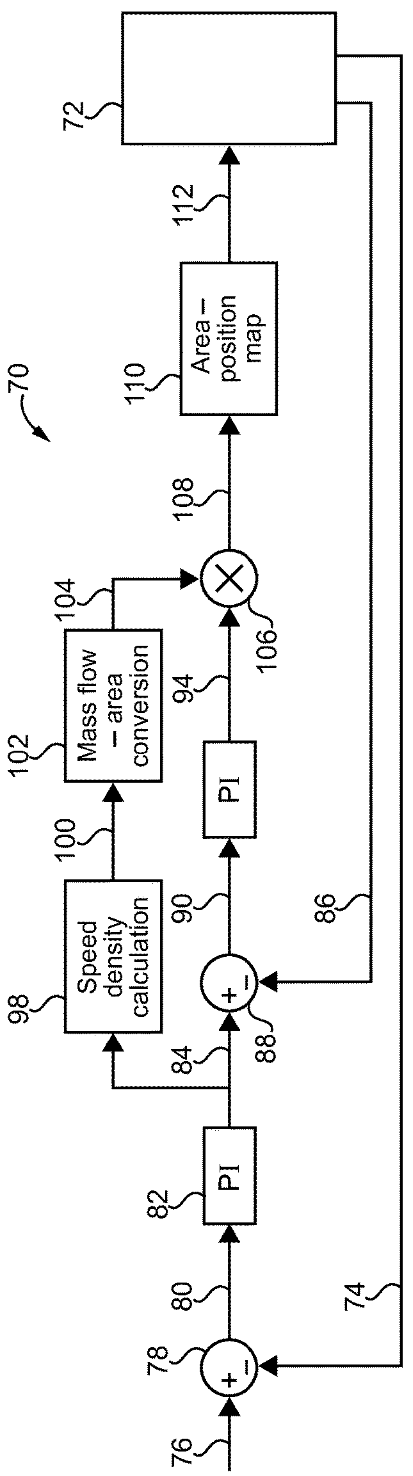
FIG. 2 is a control loop diagram for an engine speed control system, according to one embodiment.

Referring now to FIG. 2, there is shown a control loop diagram or control loop 70. In control loop diagram 70, the plant is shown at 72, and includes throttle 62 and potentially also fuel metering valve 28, and any such other elements acted upon by electronic control unit 68 or producing data used by electronic control unit 68 in engine speed control. In control loop 70, an engine speed signal representative of an actual engine speed or an observed engine speed is shown at 74, and at a calculation 78 an engine speed error 80 is calculated based upon engine speed 74 and also upon a desired engine speed 76. A proportional integral or "PI" control at 82 calculates a desired inlet manifold pressure or IMAP 84 based on engine speed error 80. An actual or observed IMAP signal is shown at 86, and a calculation 88 produces an IMAP error 90 from desired IMAP 84 and IMAP 86. A PI control, or potentially just an integral control, is shown at 92, and calculates a feedback control term 94. A speed density calculation is shown at 98 based on desired IMAP 84, and calculates a target throttle mass flow 100 to obtain that desired IMAP 84. A mass flow-area conversion calculation is shown at 102, based on target throttle mass flow 100, to produce a feedforward control term 104. The feedback control term 94 and feedforward control term 104 are used at a calculation 106 to produce a throttle area command 108. Throttle area command 108 is processed according to an area-position map 110 to produce a throttle position command 112 to vary a position of throttle 62. Control loop 70 sets forth example calculations and control logic flow that could be used in a throttle governed engine speed control strategy.

Figure 3:
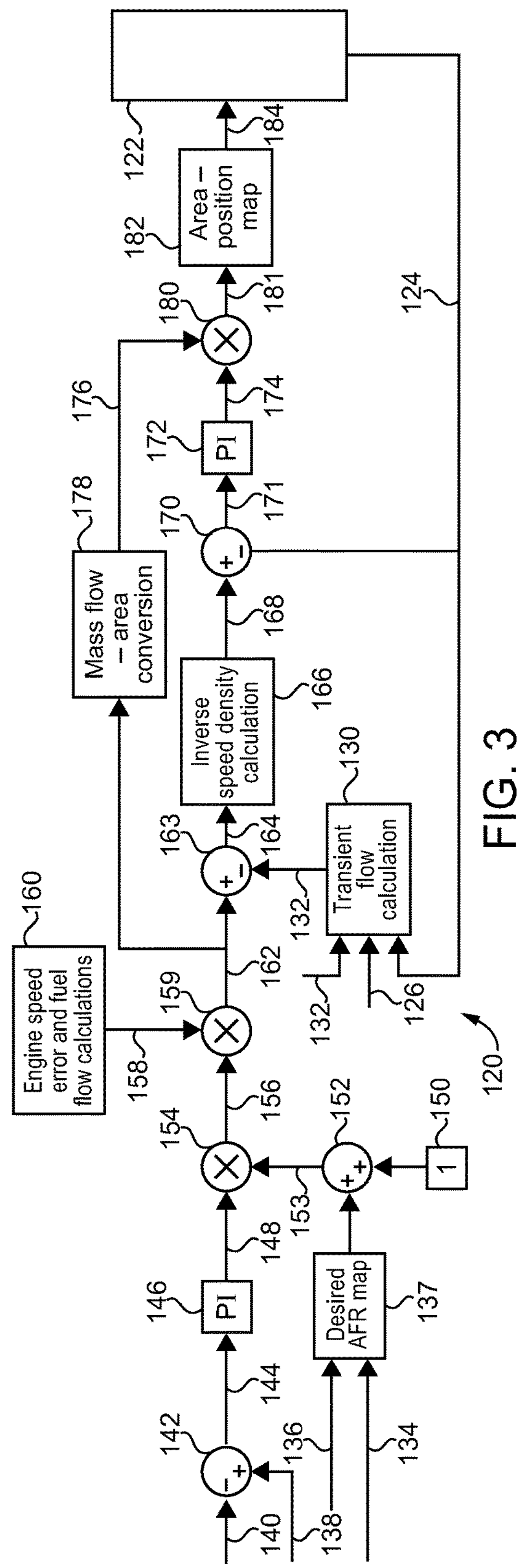
FIG. 3 is a control loop diagram for an engine speed control system, according to another embodiment.

Referring now to FIG. 3 there is shown a control loop 120 that could be used in a fuel governed engine speed control strategy. In FIG. 3 the plant is shown at 122 and could include throttle 62 and fuel metering valve 28, for instance. An actual or apparent IMAP signal is shown at 124. At a transient flow calculation 130, IMAP 124, a manifold volume 126, and an inlet manifold temperature 128 are used to calculate an actual or apparent throttle mass flow 132 that also accounts for pressure changes. Calculation 130 could utilize the $$\frac{dP}{dt} \times \frac{V_m}{RT} \quad \text{Equation 1}$$

where:

$P = IMAP$;

$t =$ time;

$V_m =$ manifold volume;

$R =$ ideal gas constant; and $T =$ manifold air temperature

An engine load is shown at 134, an engine speed at 136, and these terms are used in a block 137 according to a desired AFR map to determine a desired AFR. A numerical modifier term 150, which could be 1, is used at a calculation 152 to produce, based also on AFR map determination, a modified 1+ AFR term 153.

At a calculation 142, an actual NOx 138 and a desired NOx 140 are used to produce a NOx error term 144. A PI control is shown at 146 and, based on the NOx error 144, calculates an emissions factor 148. Emissions factor 148 with the modified 1+ AFR term 153 is used at a calculation 154 to produce an emissions factor-adjusted modified AFR term 156. In a calculation 159 a fuel flow command 158 and term 156 are used to calculate a target throttle mass flow 162. According to the control strategy depicted in FIG. 3, engine speed error and fuel flow calculations are shown at 160 to produce fuel flow command 158. Calculation 159 can thus be understood as determining a desired mass flow based upon how much fuel is being delivered into intake system 30, along with an air-fuel ratio (AFR) suitable for requested speed and load conditions. In a calculation 163 target throttle mass flow 162 and the actual or apparent throttle mass flow 132 are used to calculate a throttle mass flow error 164. At an inverse speed density calculation 166, the target throttle mass flow 162 is used to calculate a desired IMAP 168. At a calculation 170, desired IMAP 168 and actual or apparent IMAP 124 are used to calculate an IMAP error 171. IMAP error 171 is processed at a PI control 172 to calculate a feedback control term 174. At 178 a mass flow-area calculation is based on target throttle mass flow 162, to calculate a feedforward control term 176. At another calculation 180, feedforward control term 176 and feedback control term 174 are used to calculate a throttle area 181. Throttle area 181 is used in an area position map 182 to produce a throttle position command 184.

As discussed above, control strategies according to the present disclosure can include calculating a throttle area, including throttle area 108 or throttle area 181, for example, based on both feedforward control term 104, 176, and also upon feedback control term 94, 174. The throttle area is then used to determine a throttle position that will provide that throttle area, using maps 110, 182, for example. It will also be recalled that, particularly during transients, the relationship between throttle area and inlet manifold pressure can be non-linear and unpredictable, with the present disclosure providing a strategy having advantages over earlier techniques that did not provide a means for accounting or compensating for the physics underlying this relationship. In an implementation, engine speed control systems according to present disclosure can calculate the desired throttle area according to the following Equation 2:

$$\text{Area}_{th}(s) = \left[\dot{m}_{SD}^{des} + \left(\frac{V_{mani}}{R \times IMAT}\right)\left(\frac{d}{dt} IMAP^{des}\right)\right]\left(\frac{\sqrt{R \times IMAT}}{\hat{C}_d \times IMAP \times \hat{\psi}}\right) \times \left(\frac{k_p s + k_i}{s}\right)\text{IMAP\_Error}(s)$$

where:

$\dot{m}_{SD}^{des}$ = mass flow;

$V_{mani}$ = manifold volume;

$R$ = ideal gas constant;

$IMAT$ = manifold air temperature;

$IMAP$ = manifold air pressure;

$IMAP^{des}$ = desired manifold air pressure;

$\hat{C}_d$ = discharge coefficient;

$\hat{\psi}$ = constant independent of pressure ratio; and $k_p s$ and $k_i$ are gains.

In the above Equation 2, the discharge coefficient $\hat{C}_d$, is based on design of the throttle valve and is assumed to be a constant independent of throttle position. The term $\hat{\psi}$ is linked to geometry of the throttle valve and assumed to be a constant independent of pressure ratio. $\hat{C}_d$ and $\hat{\psi}$ can be determined empirically for a given throttle valve and intake system design. Also in the above equation, the term $$\frac{V_{mani}}{R \times IMAT}$$

can be understood as an expanded speed density calculation, and the term $$\frac{V_{mani}}{R \times IMAT} \text{ and } \frac{d}{dt} IMAP^{des}$$

is understood as a transient correction term. Terms $$\frac{d}{dt} IMAP^{des}$$

can be calculations performed at block 98 in control loop 70, with term $$\frac{\sqrt{R \times IMAT}}{\hat{C}_d \times IMAP \times \psi}$$

being the mass-flow to area calculation at blocks 102, 178. Term $$\frac{k_p s + k_i}{s}$$

(IMAP_Errors) represents the feedback control term 94, 174. Equation 2 is represented in the frequency domain.

INDUSTRIAL APPLICABILITY

As discussed herein, when engine 11 is operating there are various conditions that can cause engine speed to increase or decrease, necessitating some action by way of throttle governing speed control or fuel governing speed control as discussed herein. It is contemplated that these two general techniques can be used in the same engine type, and selected dependent upon the intended service environment or application of the engine. In a dynamic application where engine speed is expected to be relatively dynamic, with fast transients, it may be desirable to employ throttle governing to enable a particularly fast response. Throttle governing may also be suited well for lean burn operating strategies. For applications where engine speed is expected to remain relatively constant or change relatively slowly, with slow transients, it may be desirable to use fuel governing. Additional application specific issues may be apparent to those skilled in the art in view of the present disclosure. The present teachings could also be implemented in the form of a performance mode that can be selectively turned on or off.

The present disclosure also reflects the insight that the dual feedback and feedforward control concepts enable applications to a class of similar or identical engines without requiring overly burdensome calibration. As noted above, throttle geometry and operation can vary even among seemingly identical engines, due to factors such as manufacturing tolerances, service environment, service history, and others. The present disclosure enables the feedforward control concept to be applied to produce a relatively fast and accurate response, with the feedback control concept accounting for errors or imprecision in the assumptions underlying the feedforward control concept. Another way to understand this principle is that the feedforward control relies on certain assumptions about the response of inlet manifold pressure to throttle position and area, with feedback control correcting for inaccuracies in those assumptions that result from variations engine to engine or varying operational conditions as discussed herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine speed control system for an internal combustion engine comprising:

a throttle;

a sensor structured to monitor a parameter indicative of at least one of a pressure or a density of gaseous fuel and air in an inlet manifold of the internal combustion engine; and an electronic control unit coupled with the throttle and coupled with the sensor, the electronic control unit being structured to:

calculate a target mass flow through the throttle to produce at least one of a desired pressure or a desired density of gaseous fuel and air in the inlet manifold of the internal combustion engine;

calculate a feedforward control term based on the target mass flow through the throttle;

calculate a feedback control term based on data produced by the sensor; and command varying a position of the throttle based on the feedforward control term and the feedback control term to adjust a mass flow through the throttle toward the target mass flow.

2. The control system of claim 1 wherein the electronic control unit is further structured to calculate a throttle area based on the feedforward control term and the feedback control term, and to command the varying of a position of the throttle based on the throttle area.

3. The control system of claim 2 wherein the sensor includes a pressure sensor, and the at least one of a pressure or a density includes an inlet manifold pressure (IMAP).

4. The control system of claim 3 wherein the electronic control unit is further structured to:

calculate an IMAP error based on the data produced by the sensor; and calculate the feedback control term based on the IMAP error.

5. The control system of claim 4 wherein the feedforward control term includes a speed density term, a transient correction term, and a mass flow-to-area term.

6. The control system of claim 5 wherein the electronic control unit is further structured to calculate the throttle area according to the equation:

$$\text{Area}_{th}(s) = \left[\dot{m}_{SD}^{des} + \left(\frac{V_{mani}}{R \times IMAT}\right)\left(\frac{d}{dt} IMAP^{des}\right)\right]\left(\frac{\sqrt{R \times IMAT}}{\hat{C}_d \times IMAP \times \hat{\psi}}\right) \times \left(\frac{k_p s + k_i}{s}\right)\text{IMAP\_Errors}(s)$$

where:

$\dot{m}_{SD}^{des}$ = mass flow;

$V_{mani}$ = manifold volume;

$R$ = ideal gas constant;

$IMAT$ = manifold air temperature;

$IMAP$ = manifold air pressure;

$IMAP^{des}$ = desired manifold air pressure;

$\hat{C}_d$ = discharge coefficient;

$\hat{\psi}$ = constant independent of pressure ratio; and $k_p s$ and $k_i$ are gains.

7. The control system of claim 4 wherein the electronic control unit is further structured to:

calculate the target mass flow through the throttle based on a target IMAP;

calculate an engine speed error; and calculate the target IMAP based on the engine speed error.

8. The control system of claim 7 wherein the electronic control unit is further structured to calculate the IMAP error in an inner loop calculation, and to calculate the engine speed error in an outer loop calculation.

9. The control system of claim 4 wherein the electronic control unit is further structured to:

calculate the target mass flow through the throttle based on a desired air-fuel ratio (AFR) and a commanded fuel flow;

calculate an engine speed error; and determine the commanded fuel flow based on the engine speed error.

10. The control system of claim 9 wherein the electronic control unit is further structured to:

calculate a throttle mass flow error;

calculate a desired IMAP based on the throttle mass flow error; and calculate the IMAP error based on the desired IMAP.

11. A method of controlling engine speed in an internal combustion engine comprising:

calculating a target mass flow through a throttle to produce at least one of a desired pressure or a desired density of gaseous fuel and air in an inlet manifold of the internal combustion engine;

calculating a feedforward control term based on the target mass flow through the throttle;

receiving data indicative of at least one of a pressure or a density of gaseous fuel and air in an inlet manifold of the internal combustion engine;

calculating a feedback control term based on the data indicative of at least one of a pressure or a density of gaseous fuel and air in an inlet manifold of the internal combustion engine; and varying a position of the throttle based on the feedforward control term and the feedback control term such that a mass flow through the throttle is adjusted toward the target mass flow.

12. The method of claim 11 further comprising calculating a throttle area based on the feedforward control term and the feedback control term, and outputting a throttle position command that is based on the calculated throttle area.

13. The method of claim 11 further comprising calculating an inlet manifold pressure (IMAP) error, and wherein the calculating of the feedback control term includes calculating the feedback control term based on the IMAP error.

14. The method of claim 13 further comprising calculating an engine speed error.

15. The method of claim 14 further comprising calculating a desired IMAP based on the engine speed error, and calculating the target mass flow based on the desired IMAP.

16. The method of claim 14 further comprising determining a fueling flow command based on the engine speed error.

17. The method of claim 11 further comprising calculating the throttle area according to the equation:

$$\text{Area}_{th}(s) = \left[\dot{m}_{SD}^{des} + \left(\frac{V_{mani}}{R \times IMAT}\right)\left(\frac{d}{dt} IMAP^{des}\right)\right]\left(\frac{\sqrt{R \times IMAT}}{\hat{C}_d \times IMAP \times \hat{\psi}}\right) \times \left(\frac{k_p s + k_i}{s}\right)\text{IMAP\_Errors}(s)$$

where:

$\dot{m}_{SD}^{des}$ = mass flow;

$V_{mani}$ = manifold volume;

$R$ = ideal gas constant;

$IMAT$ = manifold air temperature;

$IMAP$ = manifold air pressure;

$IMAP^{des}$ = desired manifold air pressure;

$\hat{C}_d$ = discharge coefficient;

$\hat{\psi}$ = constant independent of pressure ratio; and $k_p s$ and $k_i$ are gains.

18. An internal combustion engine system comprising:
an internal combustion engine;
an intake system structured to convey a gaseous fuel and air to the internal combustion engine;
a throttle;
an engine speed control system including a sensor structured to monitor a parameter indicative of at least one of a pressure or a density of gaseous fuel and air in an inlet manifold of the internal combustion engine; and
an electronic control unit coupled with the throttle and coupled with the sensor, the electronic control unit being structured to:
calculate a target mass flow through the throttle to produce at least one of a desired pressure or a desired density of gaseous fuel and air in the inlet manifold of the internal combustion engine;
calculate a feedforward control term based on the target mass flow through the throttle;
calculate a feedback control term based on data produced by the sensor; and
command varying a position of the throttle based on the feedforward control term and the feedback control term to adjust a mass flow through the throttle toward the target mass flow.

19. The system of claim 18 wherein the electronic control unit is further structured to:
calculate an engine speed error;
calculate a desired IMAP based on the engine speed error; and
calculate the target mass flow based on the desired IMAP.

20. The system of claim 18 wherein the electronic control unit is further structured to:
calculate the target mass flow through the throttle based on a desired air-fuel ratio (AFR) and a commanded fuel flow;
calculate an engine speed error; and
determine the commanded fuel flow based on the engine speed error.

* * * * *